United States Patent [19]
Becker

[11] 3,798,406
[45] Mar. 19, 1974

[54] PROCESS FOR WELDING METAL COATED SHEET STRUCTURES

[76] Inventor: Otto Alfred Becker, Robert Koch Strasse 59, 66 Saarbruecken 6, Germany

[22] Filed: Mar. 10, 1971

[21] Appl. No.: 122,674

[30] Foreign Application Priority Data
Mar. 10, 1970  Germany............................ 2013794
Feb. 3, 1971  Germany............................ 2104888

[52] U.S. Cl. ................................................. 219/92
[51] Int. Cl. ...................... B23k 9/28, B23k 11/00
[58] Field of Search .................... 219/91, 92, 93, 94

[56] References Cited
UNITED STATES PATENTS
3,614,375   10/1971   Becker ................................ 219/91
2,970,204   1/1961   Picco et al. ........................... 219/92
3,629,544   12/1971   Becker ................................ 219/83

Primary Examiner—Thomas J. Kozma
Assistant Examiner—Hugh D. Jaeger
Attorney, Agent, or Firm—Erich M. H. Radde

[57] ABSTRACT

This invention is directed to a method of and apparatus for linearly and/or spot welding metal plates that have either clad, coated or oxidized surfaces. In some instances only the exposed surface coatings are removed from the zone to be welded to bare the underlying metal, after which welding is effected and, if necessary, the exposed welded zones are reclad or recoated with the same type of material as was originally removed. Where relatively thick plates are to be welded, sufficient material is removed from at least one of them to define a remaining thin web in or along the zone of welding that can be displaced or forced into linear contact with an adjacent area as an incident to welding, after which the exposed welded zone is reclad or recoated. For spot welding the plates may be bored or drilled at predetermined intervals to receive and retain sets of weldable inserts which become welded together and to the surrounding metal. Recoating or recladding of the exposed welded zones may be effected either by applying molten metal to the surface to be coated, or by wiping pre-heated metal against such surface, or by electrolytic deposition. The method is especially effective with zinc or tin coated or clad iron or steel sheets or plates and with aluminum sheets or plates having oxidized faces.

11 Claims, 14 Drawing Figures

INVENTOR.
OTTO ALFRED BECKER
BY
Erich M. H. Radde
AGENT

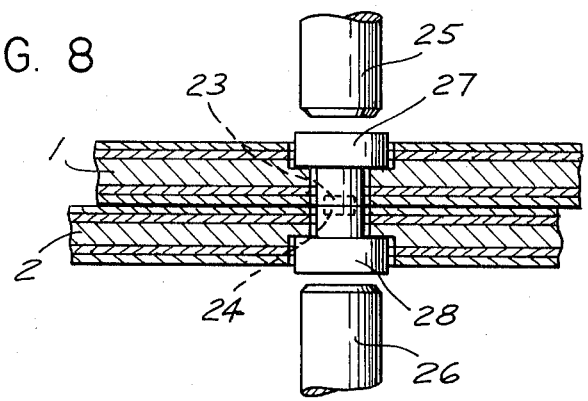
FIG. 8
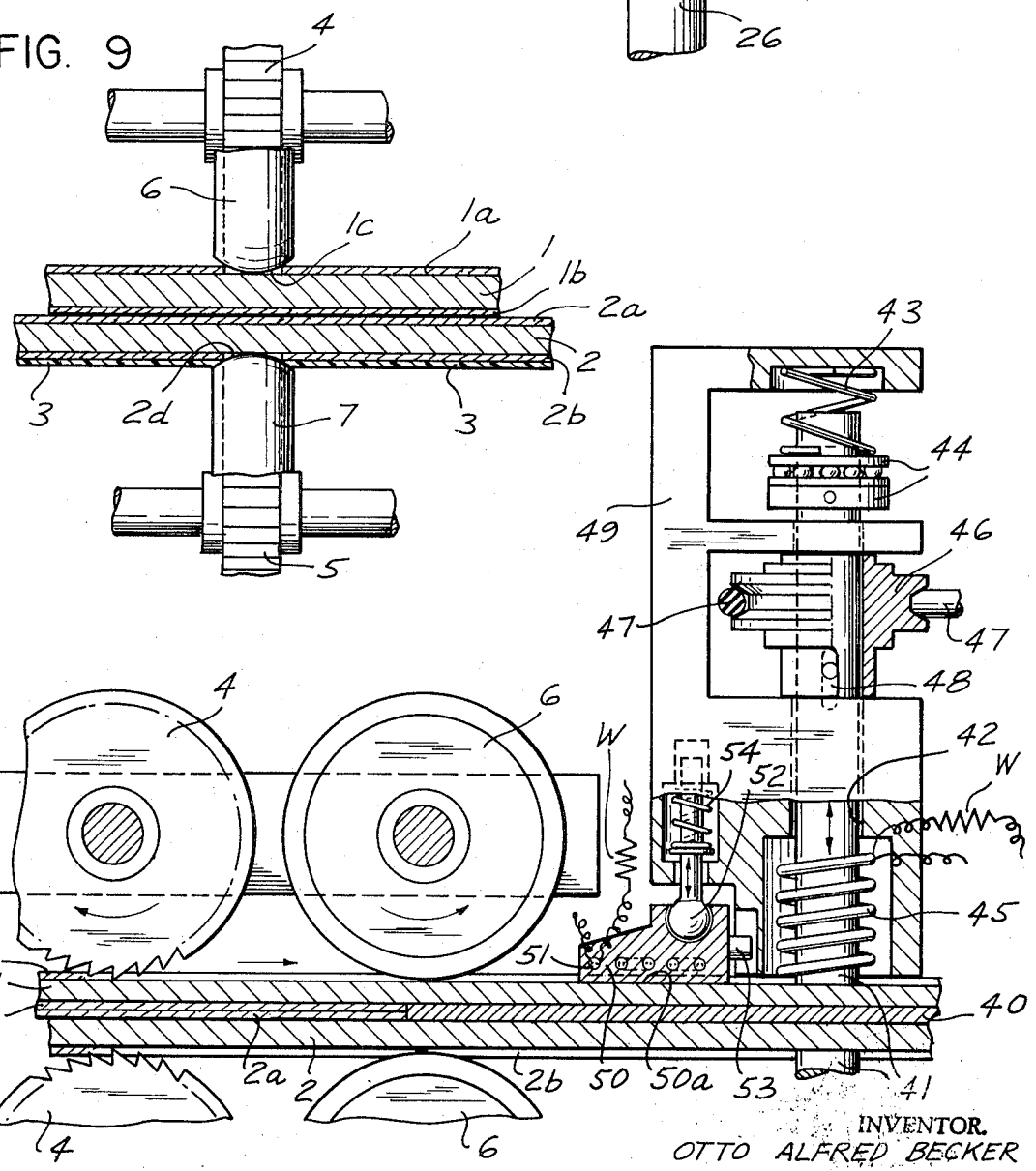
FIG. 9
FIG. 10

INVENTOR.
OTTO ALFRED BECKER
BY
AGENT

FIG. 13
FIG. 14
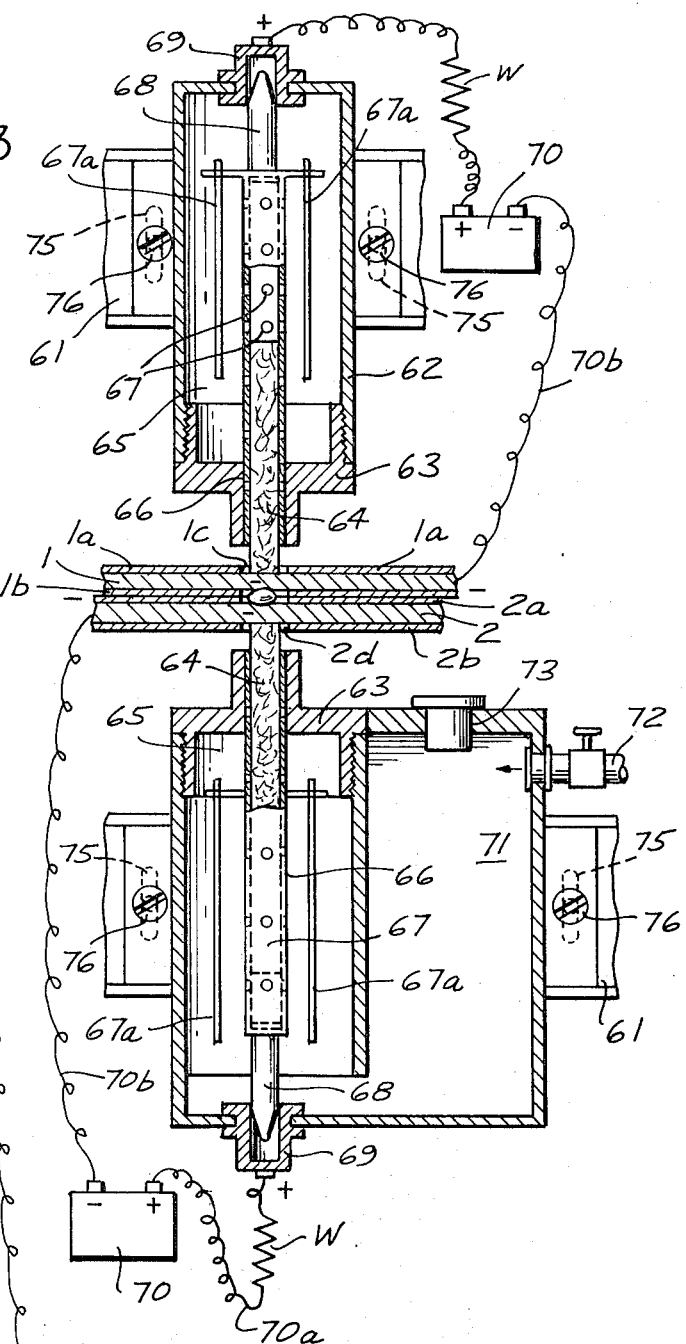
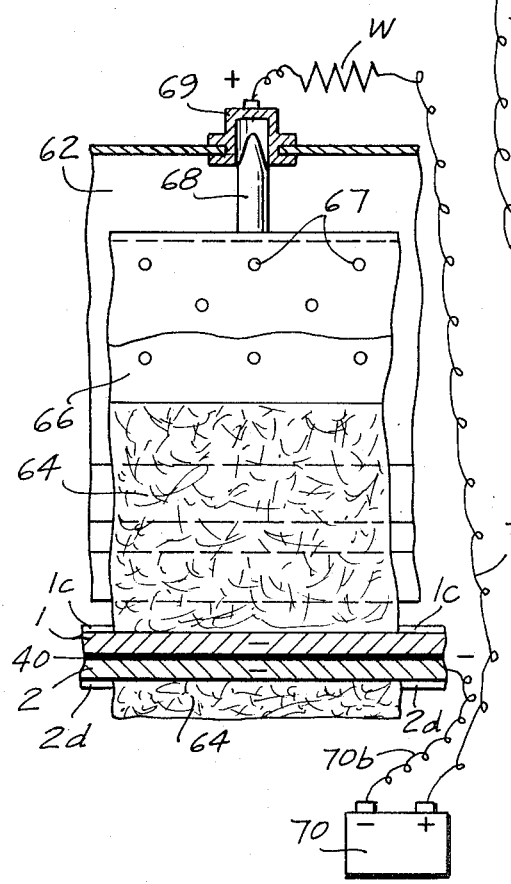
INVENTOR.
OTTO ALFRED BECKER

PROCESS FOR WELDING METAL COATED SHEET STRUCTURES

BACKGROUND OF THE INVENTION

1. Field of the Invention

The present invention relates to a method for welding metallic bodies in general and more particularly iron bodies which are coated or clad with a layer of metal such as zinc or tin, especially zinc or tin coated sheet iron, or aluminum having an aluminum oxide layer, by means of electrodes, especially of copper electrodes, with welding machines as they are known to the art, especially with electric resistance, induction, extrusion, or arc welding machines.

2. The Prior Art

Resistance welding of sheet iron or steel plate coated or clad with a zinc or tin layer causes considerable difficulties due to the low melting point of zinc or tin and to the tendency of such materials to alloy with the copper electrodes. Alloying of the zinc with the copper of the electrode and/or the iron plate at or along the weld may cause a noticeable decrease in the strength of the weld. In order to achieve sufficient strength, a greater welding current intensity, increased pressure exerted by the electrodes, and frequently prolonged welding times are required. As a result thereof the welding spot or surface is heated to a considerably increased temperature and the electrodes are prematurely worn out or become brittle while the coating is partly destroyed, for instance, by burning and oxidation of the zinc to zinc oxide.

Considerable difficulties are also encountered on welding hot-galvanized or hot tin-coated iron plate because its surface is rather rough so that the working surfaces of the electrodes contact the metallic surface only at irregular points. Due to such a point by point contact the welding zone or spot becomes locally overheated. As a result of such an overheating alloying of the electrodes is increased. The surface resistance of the tip of the electrode also increases very considerably and more so as the thickness of the zinc layer increases.

In order to avoid these difficulties and especially in order to increase the usefulness of the electrodes, it has been suggested to use tungsten electrodes. However, metallic tungsten has only about 20 percent of the electric conductivity of copper and, in addition thereto, is quite expensive.

SUMMARY OF THE INVENTION

This invention overcomes such problems. Therefore an object of the present invention is to provide a simple and effective method of welding together metallic bodies and especially iron or steel bodies, at least one of which is provided with a zinc or tin coating.

Another object of the present invention is to provide welded articles of zinc or tin-plated iron or steel in which the welds are of surprisingly high strength.

Still another object of the present invention is to provide a simple and effective method of welding together aluminum bodies having an aluminum oxide layer.

Another object of the present invention is to provide welded articles of aluminum in which the welds are of surprisingly high strength.

A further object of the present invention is to provide a novel and improved welding machine for carrying out the method of welding together metallic bodies according to the present invention.

Other objects of the present invention and advantageous features thereof will become apparent as the description proceeds.

In principle the method of the present invention for welding metal-coated and especially galvanized or tin-plated iron or steel bodies or superficially oxidized aluminum bodies comprises removing that part of the welding zone which is in contact with the electrodes, by a milling or the like treatment at least through the surface of the underlying iron, steel, or aluminum surface in a predetermined, geometrically defined area such as an arcuately or rectangularly cross-sectioned groove or a circular, annular, or cylindrical area. Thereafter, electric contact is established between the blank iron or aluminum bodies so as to effect welding together of said bodies. If required, a part of the coating or clad layer corresponding in shape and size to the removed coating layer is then reapplied to those areas of the outer surface of the welded bodies from which said coating or clad layer was removed. This treatment serves to reestablish the substantially uninterrupted, continuous coating layer. Thus the method according to the present invention compensates for the degradation of the surface properties of the welded bodies which otherwise would have been caused by prior welding methods.

Welding is effected by means of conventional welding machines, especially machines for electric resistance welding.

In a preferred embodiment of the method of this invention both faces of at least one of the bodies to be welded are grooved, at least through the thickness of the coatings, along the projected line of weld to define an intermediately positioned web of reduced thickness that is deformable toward or into contact with an adjacent face of the other body.

Especially when welding thick steel plates coated with metal such as zinc, such a reduction in the plate thickness can, for instance, be effected by grooving their opposed inner faces along the projected line of weld. Said steel plates, of course, can be of different thickness.

Either type of grooving results in at least one web of reduced thickness that can be deformed into contact with the adjacent face portion of the opposed body for either line or spot welding. If line welding is desired, the rim of the electrode would be narrow but continuous, whereas for spaced spot welding the electrode rim would be toothed. In this manner the electric resistance, which is rather low when welding wide contacting surfaces of thick sections or plates is increased to an optimum value.

Furthermore, this procedure prevents the layers between the iron plates, for instance the zinc layers, from alloying with the iron in the weld to a degree that would reduce the strength of the weld.

Thereby it is of advantage that milling or grooving of the iron or steel plates can be carried out in a very precise manner to attain any desired thickness of the layered plate or sheet-iron along the projected line of weld. Thus it is possible to join or bond to each other steel plates of any desired thickness by resistance welding.

According to another embodiment of the present invention a local increase of the resistance can also be achieved by forming a straight-line, arcuate, or circular bridge or web, of predetermined cross-section, directed to the other welding area, by removing by milling the coating layer at the place of welding and by exposing the underlying iron surface.

According to other embodiments said bridge or web may also be of rectangular cross-section, sharp-edged, or acute-angled, and may linearly contact the adjacent welding area with its preformed face. Said bridges or webs can not only be shaped by milling but also by stamping.

Thus it is advisable to provide, for the purpose of spot welding, an annular bridge with sharp or acute-angled edges at the welding area, said annular bridge circularly contacting the justapositioned welding area, for instance, under the pressure of an electrode. In this manner it is also possible to increase the current resistance, to reduce the welding time, and to decrease the required amount of welding heat.

The method according to the present invention has the further advantage that, on welding, the roller-shaped welding electrode follows the milling disk, that the roller-shaped welding electrode and the milling cutter are driven by the same driving means; and that a transmission is provided between said roller-shaped electrode and said milling cutter, said transmission imparting to the roller-shaped electrode a different number of revolutions and/or direction of rotation than imparted to the milling cutter.

As stated above, the method according to the present invention can also be used when the justapositioned faces of both bodies to be welded are provided with an electrically conductive metallic surface, for instance, with a galvanized surface. For this purpose one of the welding areas is provided with a straight bridge-like or annular ridge or a pointed end and an insulating thermoplastic foil or the like is placed between the plates within the welding area. Thereby electric contact is achieved only at the welding areas by the pressure of the electrode. In this manner the passage of current is concentrated upon the welding areas of the iron plate which are bare of the coating metal and which can be reduced in thickness to their optimum size.

In place of using electrodes for resistance welding, pressure stamps or supports or pressure rollers which are without current can be used and the parts to be welded can be conductively connected with each other laterally therefrom, for instance by means of tongs or pliers which form a conductive shunt.

According to other embodiments of the present invention it is of advantage to provide insulating sheets or films on both sides of the linear bridges or webs so that only said bridges or webs produce an electrically conductive connection.

In a similar manner one first part to be welded can be connected with or joined with or bonded to another second part to be welded which carries a loosely or, respectively, firmly attached insulating thermoplastic plastic layer at its face juxtaposed to said first part to be welded. According to the present invention both parts to be welded are connected with each other in an electrically conductive manner. The necessary contact is achieved by means of an insulated pressure roller whereby the insulating plastic layer between the two plates or sheet irons is melted away in linear progression. In this manner it is possible to prevent any formation of electric shunting. Contact is established only immediately before the action of the welding current.

Deformation of the welding area can be effected in a highly advantageous manner by means of suitably profiled electrode points or by embossing or stamping, especially by blister- or knob-like, annular, point-like, furrow- or groove-like or the like shaped embossing or stamping.

When using the indirect multipoint welding method, it is of advantage to arrange one first electrode and beside it a second electrode, preferably parallel to the first electrode, upon the same part to be welded or upon the projecting back side of the other part to be welded which is turned toward the first electrode. Heretofore, galvanized sheet iron could be indirectly spot-welded not at all or only at a distance of each point from the other of more than 200 mm., because the copper electrodes were readily alloyed. However, when proceeding as described hereinabove, it is possible to achieve optimum welding results in a uniformly reproducible manner by spot welding whereby the spots are arranged at any desired small distance.

Furthermore, suitable profiled metal or alloy disks, strips, or the like can be inserted in the welding areas from which the zinc or tin layer has been removed, or additionally between the two welding areas in order to meet optimum requirements at the weld after welding. If desired, the iron parts to be welded or at least one thereof may have a bore hole. The inserts may be T-shaped pieces the heads of which are outside the hole and, when both iron parts to be welded are bored, these T-shaped pieces are inserted so that their heads extend outwardly and that, on welding, a double T-shaped connection is formed.

When using a welding roller, it may have a convex or bulged working surface and the disk-shaped milling cutter may be about as wide as the convex or bulged working surface of the welding roller.

According to a special embodiment of the present invention pressure stamps or rollers without current are caused to act on the outer surfaces of the areas to be welded, whereby the welding current runs parallel to the faces of the sheet iron or plate so that only the predetermined welding areas are electrically conductive. Welding together of the two plates or sheet iron takes place only at said areas and damage or injury to any external decorative layer is avoided.

It is of special advantage that according to the present invention removal of the metal layer such as the zinc or tin layer or of the aluminum oxide layer, welding, and recoating of the welded areas, for instance, with zinc, tin, or aluminum oxide can be carried out in a single operation.

Re-applying the metal layer, such as the zinc or tin layer can readily be effected by means of a metal rod such as a zinc or tin rod which is spring-pressed at least substantially vertically upon the exposed welded zone and whereby said zone and/or the rod is preheated to the melting point of the metal to be applied to the iron plate. Thereby the zinc or tin rod can rotate around its longitudinal axis and heating can be effected by means of an electric heating spiral placed around said rod. The exposed welded zone can be heated by means of a separate, preferably electric, heating device arranged between welding roller and rod. Thereby the welded part and the relayering device can be moved relatively to each other whereby the rod may slide with its lower end and in contact with the exposed welded area. The welded part and the device for recoating the same with a metal layer, such as a zinc or tin layer, of course, need not be moved during welding. The relayering or recoating device may swivel about by means of a ball-and-socket joint.

To effect recoating, the metal to be applied is heated to a highly viscous or completely fluid state and is applied in that state to the exposed welded area. Or the exposed welded area is preheated to the melting temperature of the metal to be applied which is then pressed, preferably also in the preheated state, upon the exposed welded area to be recoated.

It is the preferred procedure to arrange the recoating device above and below the welded seam so that the welded body need to proceed only once through the recoating operation.

The parts to be welded need not always be deformed. In some instances it is sufficient to remove the outer coating as well as the inner coating of the parts to be welded without deforming said parts to cause their inner surfaces to contact each other.

A device for recoating the welded areas may consist, for instance, of a container having a slit-like lower opening or nozzle which is filled with glass wool or other heat resistant and non-alloying filter material. Fluid zinc or the like is filled into the container and passes out through said slit-like opening upon the exposed welded area which is caused to pass underneath said opening. The fluid zinc or the like coating material may be forced through said slit-like opening by applying compressed air thereto.

The recoating or relayering device can also be a container with fluid zinc wherein a rotating wheel immersed in the zinc bath and being spring-mounted in vertical direction is provided. Said wheel is adjoining the exposed welded zone. Its width corresponds to the width of said exposed welded zone. Such a device has proved to be especially useful for recoating or relayering of the lower surface of the welded parts. The wheel is caused to rotate by its engagement with the stripped area or zone.

The wheel may consist of the metal to be applied to the stripped welded area. For recoating, the wheel and/or the exposed welded area is heated to the melting point of the metal to be applied.

Spot welding is preferably carried out by means of a device having electrodes, heating rods, and zinc rods arranged in pairs above and below the area to be welded.

If desired, the zinc rods can also be heated. Electrodes, heating rods, and zinc rods are in engagement with the stripped area to be spot welded. Front milling cutters and the like milling devices may be provided in advance of the electrodes in order to simultaneously remove the zinc or the like layer.

It is also possible to provide, in place of the zinc rod, a stack of zinc plates or lamellas, the thickness of each of which is the same as that of the stripped zinc layer whereby the recoating device may preferably have an arrangement for the automatic selective release of the zinc plates or lamellas.

Recoating or relayering may also be effected by means of a galvanoplating device which consists essentially of an absorbent fabric impregnated with a suitable electrolyte, and of a source of current. The impregnated fabric is placed directly into contact with the exposed zone or area and the electrolyte is in contact with exchangeable zinc plates. Thereby the galvanoplating device and the welded part can be moved relatively to each other. For instance, the exposed welded plate can be moved under the fabric in a reciprocating sliding motion. The welded part may also be at rest and the recoating or relayering device may be reciprocatingly moved in longitudinal direction above the welded part. For this purpose the fabric is arranged along the entire longitudinal welded seam.

Furthermore, the impregnated fabric can be provided in a rectangular casing or box having its lateral walls perforated to permit the electrolyte to pass therethrough. Said casing or box is placed directly alongside the exposed welded zone or area. The cross-section of its outlet corresponds to that of the exposed zone or area.

Preferably exchangeable zinc anodes are provided in the electrolyte container alongside the casing for the fabric.

When the galvanoplating, recoating, or relayering device is arranged underneath the welded zone or area, it is advisable to provide a container or vessel communicating with and being placed alongside the electrolyte container in order to maintain the required electrolyte level. Both the electrolyte container and the container or vessel communicating therewith may be maintained under pressure by compressed air.

As stated hereinabove oxidized aluminum bodies can also be subjected to the method according to the present invention in place of galvanized or tin-plated iron bodies. Thereby the aluminum oxide layer corresponds to the tin or zinc layer. When welding such oxidized aluminum bodies by the method of the present invention, it is the preferred procedure not to start welding immediately after removing or stripping off the aluminum oxide layer but to wait until there is reformed an aluminum oxide layer of such an insulating power that optimum welding resistance is achieved. Thereby it must be taken into consideration that aluminum oxide melts at 2,060°C. while pure aluminum melts already at 657°C.

Blank aluminum surfaces oxidize within one hour. In view of the fact that pure aluminum has an electric conductivity which is about three times higher than that of steel it is possible to wait after stripping the oxide layer by milling until a degree of oxidation of the aluminum is attained that is most favorable for subsequent welding. In this manner an exactly predeterminable degree of oxidation of the aluminum is achieved so that optimum and constant welding results are achieved. Thereby, the electric conductivity of pure aluminum which per se is too high, can be reduced by the time-dependent degree of oxidation to the most favorable conductivity required in any given instance. This result is achieved in an unsurpassed manner by the method according to the present invention wherein the aluminum oxide is removed or stripped by milling from the aluminum bodies to be welded, whereafter the partly reoxidized aluminum bodies are welded together.

Of course, the various embodiments of the method of this invention can also be employed in welding aluminum bodies to other metal bodies. Thus on welding together aluminum parts with disks, rings, or pieces of iron or steel inserted into holes of the aluminum parts, a connecting or bonding piece of iron passing through the aluminum is produced. The aluminum with its much lower melting point is displaced by the iron because it becomes fluid befor the iron.

Welding of aluminum plates of low thickness is especially difficult due to the high electric conductivity of the aluminum. By suitably deforming the aluminum plates at the welding places by milling or stamping, for instance, in the shape of a blister or a pointed ring or also by means of profiled electrodes, such a high increase in the electric resistance is achieved that even thin aluminum plates can be welded in a fully satisfactory manner. Thereby, the further advantage is achieved that the area surrounding the welding place is affected by the heat generated on welding for a limited distance therefrom only. This welding method is preferably carried out by impulse welding machines.

BRIEF DESCRIPTION OF THE DRAWINGS

The object and other features of the present invention will become more readily apparent from the drawings which show representative or illustrative embodiments of the present invention. In said drawings

FIG. 8 is a fragmentary cross-sectional view of a device with T-shaped insert pieces;

FIG. 9 is a fragmentary cross-sectional view of a device for producing a cathodic protective zinc coating;

FIG. 10 is a fragmentary, longitudinal, cross-sectional view of a device for recoating longitudinal welding seams;

FIG. 13 is a fragmentary cross-sectional view of a device for electroplating for spot welding as seen in longitudinal direction of a longitudinal welding seam; and FIG. 14 is a fragmentary, transverse cross-sectional view of the device of FIG. 13.

In these FIGS. like reference numerals refer to like parts of the apparatus.

PREFERRED EMBODIMENTS OF THE INVENTION

Figure 1:
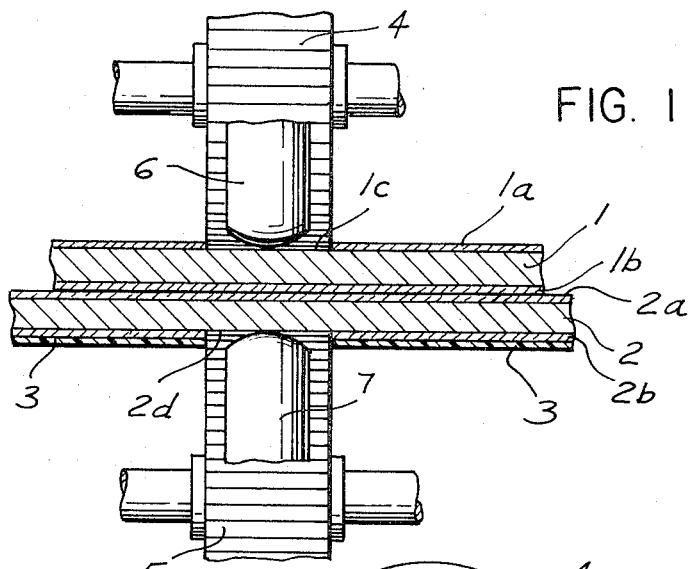
FIG. 1 is a fragmentary, vertical, transverse cross-sectional view of a device for carrying out the method according to the present invention during the step of removing the coating or layer.

FIG. 1 shows in cross-sectional view iron or steel plates 1 and 2 provided on both sides with metallic coatings such as zinc coatings $1a$ and $1b$ on plate 1 and zinc coatings $2a$ and $2b$ on plate 2. Plate 2 carries additionally on its lower surface a plastic coating 3. Disk milling cutters 4 and 5 operate above and below the plates which are superposed, and remove the upper zinc coating $1a$, the lower plastic coating 3, and the lower zinc coating $2b$. Said milling cutters are followed by welding rollers 6 and 7 as shown in FIG. 2.

Figure 2:
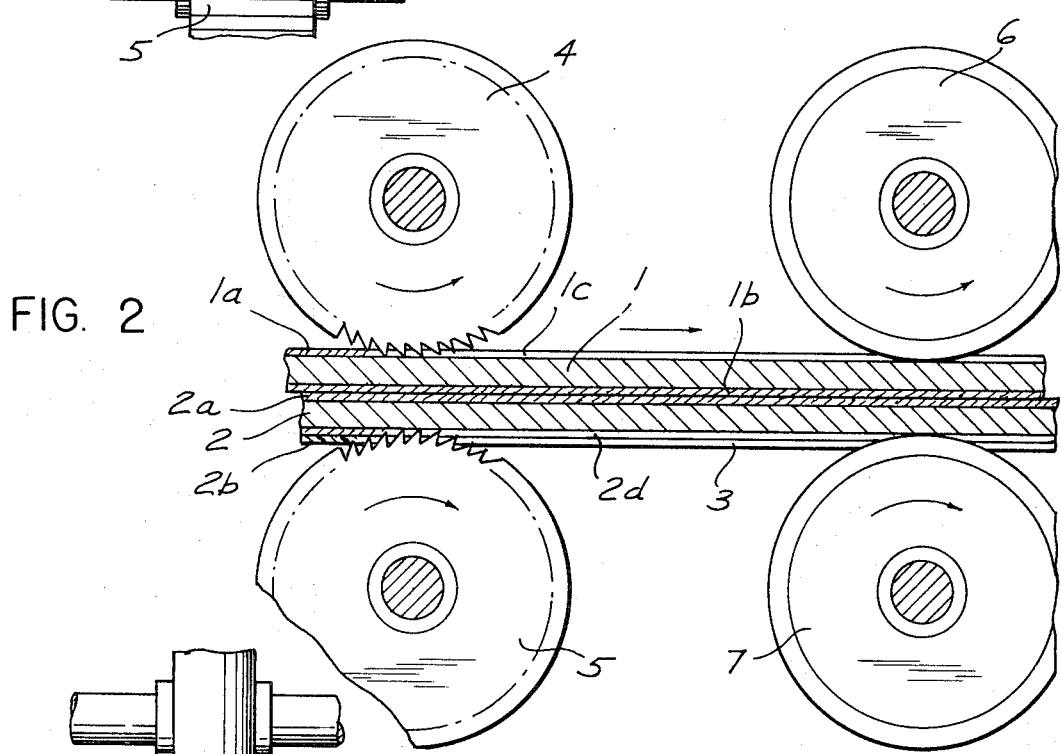
FIG. 2 is a longitudinal, vertical cross-sectional view of the device of FIG. 1.

In said FIG. 2 the arrow indicates the direction of movement of the plates 1 and 2. The disk milling cutters can be rotated by the same driving element whereby any suitable transmission or gearing (not shown) is interposed. They may have a higher speed of rotation than that of the welding rollers 6 and 7 and may also be driven in opposite direction. They are supported in vertically adjustable bearing mounts in order to precisely adjust the depth of the milled areas and obtain constant optimum welding conditions at the milled welding areas of bare metal. In the case of metallic decorative coatings or layers the striplike milled area is to be kept sufficiently wide that the adjacent metallic decorative layer areas remain undamaged.

The disk milling cutters can, of course, be driven independently from the drive of the rollers. The plates may be milled in separate operations preferably simultaneously at their lower surface, if required.

Figure 3:
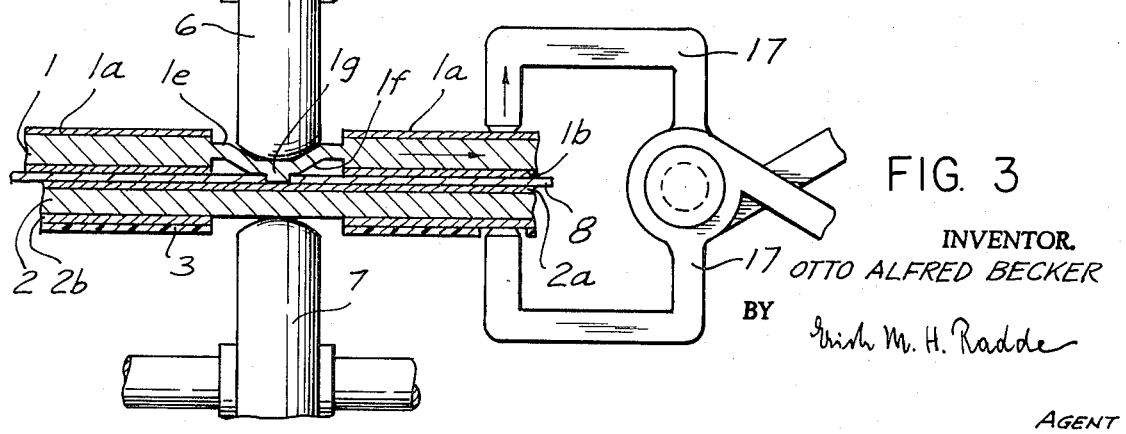
FIG. 3 is a cross-sectional view similar to FIG. 1 but showing a welding web pressed downwardly by means of the one electrode.

FIG. 3 illustrates an iron plate 1 provided on both sides with a metallic coating, for instance, with zinc. The plate was milled so as to remove not only the zinc coating but also part of the iron plate 1 at its upper side as indicated at $1e$. Likewise part of the lower side of said plate 1 is milled by means of a disk milling cutter which has a clearance at the center line of its circumference so as to form the milled recesses $1f$. Providing said clearance results in effecting milling only laterally from the clearance so that plate 1 extends with a remaining intermediate bridge or web $1g$ downwardly toward plate 2. Said plate 2 is coated with a metallic coating on both sides and has at its lower face in addition thereto a plastic layer 3.

Thermoplastic insulating foil 8 is interposed, i.e. inserted by glueing or the like, between plate 1 and plate 2. Said foil 8 has predetermined chemical and physical properties and serves to prevent current conductive contact of the bridge $1g$ on that part of the plates which has not yet been welded together. Due thereto formation of an electric shunt circuit is prevented. Both plates 1 and 2 are conductively connected with each other in any desired manner, for instance, by means of the pincers 17. Due thereto the welding current is conducted from the one electrode to the other one through the plates via the pincers. Thereby, the welding area is heated underneath the working surface of the electrode rollers. The foil 8 melts progressively below the bridge $1g$ so that contact between the two plates which is required for progressive welding by means of electrode rollers is achieved.

The insulating intermediate layer under the bridge $1g$ need not be provided, if the distance between bridge $1g$ and plate 2 or, respectively, its metallic coating $2a$ is sufficiently large so that contact under the working faces of the welding rollers is achieved only by the action of said rollers. The metallic coating $1b$ and $2a$ are to be insulated from each other on both sides of the welding bridge by providing insulating intermediate layers, thereby preventing formation of shunt circuits.

Figure 4:
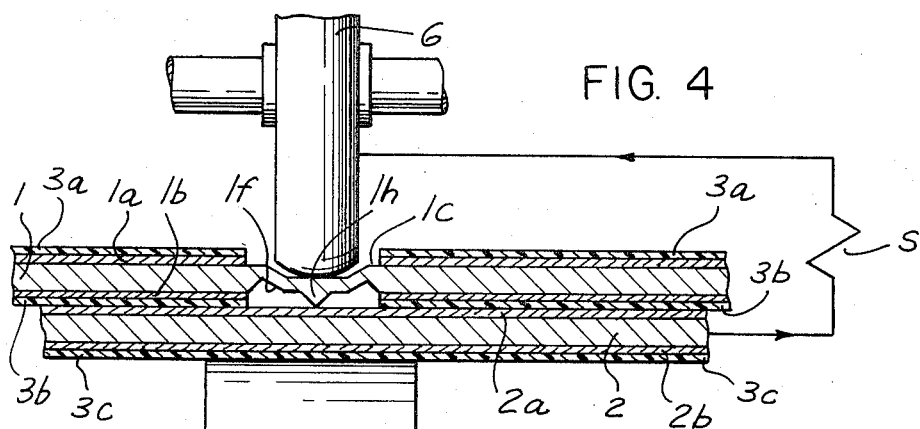
FIG. 4 is a cross-sectional view similar to FIG. 3 but with a support roller without current.

Instead of retaining, on milling, one or several webs or bridges $1g$ of the shape as shown, bridges of different shape, for instance, of triangular cross-section may be produced by milling. Such bridges are shown in FIG. 4. According to said FIG. 4 plate 1 carries, in addition to the metallic coatings $1a$ and $1b$ provided on both sides, insulating coatings $3a$ and $3b$, for instance, of plastic material which coatings are also provided on both sides. Layers 3a and 1a are removed by milling from the upper side of plate 1, thus forming the milled strip-like recess 1c. At the lower side of plate 1 there is formed the milled recess 1f by milling with a specially constructed milling cutter having a corresponding clearance, said milling cutter leaving the bridge or web with a lower longitudinal rib 1h of triangular shape.

The upper side of plate 2 carries only the metallic coating 2a while its lower side is provided with the metallic layer 2b and the plastic layer 3c. To keep said plastic layer 3c undamaged during welding, an idler water-cooled roller 9 without current is provided opposite to the welding roller 6. Said roller 9 exerts the counter pressure. The secondary current S is conducted via roller 6 and plate 1 and, after rib 1h of the bridge or web has been pressed down into electric contact with the metallic coating 2a and plate 2, it is conducted back through plate 2 as indicated by the electric connection scheme. If plate 2 is of sufficient thickness and if the welding time can be kept extremely short, the lower decorative layer 3c is not damaged. Even if no lower plastic layer 3c is provided, the lower zinc layer 2b remains intact.

Figure 5:
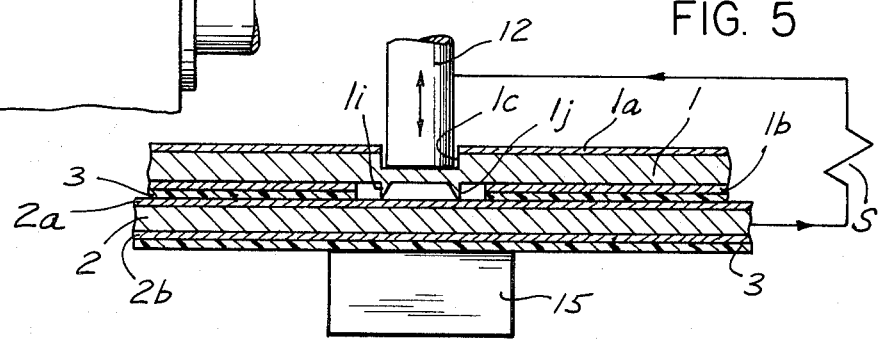
FIG. 5 is a fragmentary cross-sectional view of a device for spot-welding.

FIG. 5 is illustrative of the manner in which the principles of this invention may be used for spot or annular welding. In this embodiment plate 1 is superposed in welding position upon plate 2 which rests on a fixed support 15. The electric current is conducted in the same manner as in FIG. 4. To effect spot welding a sharp-edged depending annulus 1j is provided in place of the longitudinal rib 1h. These types of welding can also be carried out by condenser discharge (impulse) welding current.

Figure 6:
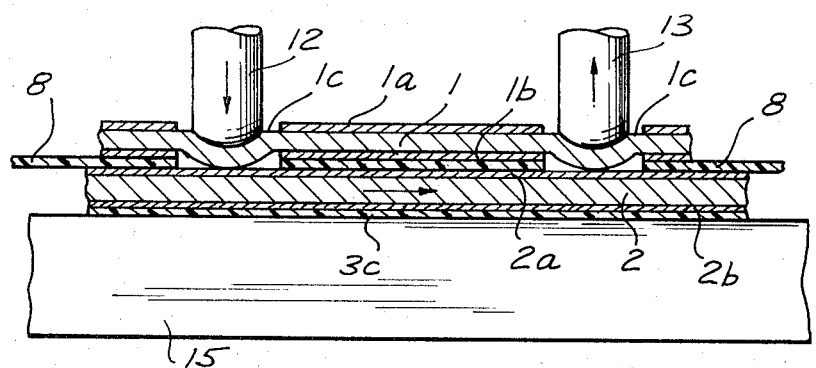
FIG. 6 is a fragmentary cross-sectional view of a device with reciprocable electrodes arranged side by side.

FIG. 6 shows two plates 1 and 2 being provided on both sides with metallic coatings 1a, 1b, 2a, and 2b. Plate 1 is thinner than plate 2. Plate 2 has additionally at its lower face a decorative layer 3c which should remain intact during welding. Welding together of the two plates is effected indirectly by the spot welding electrodes 12 and 13 which are positioned parallel to each other.

The metallic coatings 1a and 1b have been removed by milling below the working faces of both electrodes 12 and 13 so as to expose circular areas of the bare iron of plate 1 thereunder. To insulate the metallic surface of coating 1b of plate 1 from the metallic surface of coating 2a of plate 2, there is provided insulating layer 8, for instance, of a plastic film or sheet glued to said surface 1b, or of paper, a lacquer coating, or the like. Opposite the milled circular stripped areas 1c and 1c' on the upper face of plate 1 there are removed from the lower face of plate 1 corresponding circular stripped areas while simultaneously the insulating layer 8 is also correspondingly removed. Both plates 1 and 2 contact each other at points or spots due to the pressure of the electrodes 12 and 13. The electric current is conducted from the one electrode 12 through the welding spot of plate 1 to plate 2 and is reconducted from said plate 2 to the other electrode 13. If the plate 2 is of sufficient thickness and if the welding time, for instance, when using a condenser impulse welding machine, is extremely short, the decorative layer 3c is not damaged.

When using, in place of the continuous plate 1, two separate plate parts, it is possible to weld these two plates simultaneously to the plate 2 without formation of a shunt circuit.

It is also possible to provide currentless pressure stamps or disks, in place of the electrodes. Thereby, the poles of the welding current are directly connected to both plates 1 and 2. When proceeding in this manner, the zinc-plated layer 1a as well as an additional insulating layer, for instance, of plastic may also remain intact with the exception of the hump- or blister-like embossed recesses.

The principles of the present invention as they are shown in FIGS. 1 to 5 may also be applied to the spot or annular welding of plates where the areas to be welded have been completely removed as by drilling or boring. In this variation the voids thus created are filled by suitably shaped plugs which replace the webs or bridges of FIGS. 3 to 5.

Figure 7:
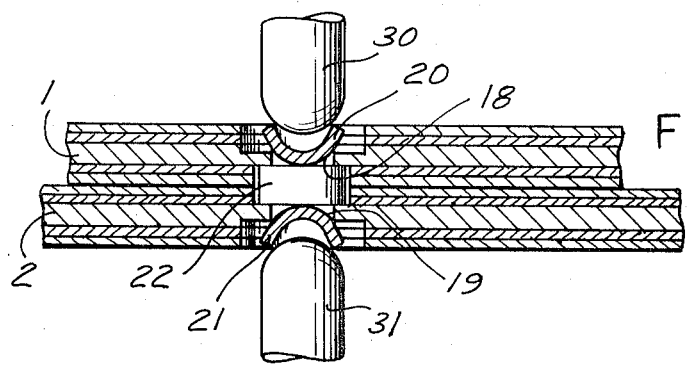
FIG. 7 is a fragmentary cross-sectional view of a device with concavo-convex insert pieces.

FIG. 7 shows cylindrical, milled areas with bore holes 18 and 19 through the carrier material of plates 1 and 2. For welding together plates 1 and 2 with their coatings, there are inserted into the stripped and more deeply milled areas, for instance, concavo-convex disks 20 and 21 of steel or the like. An intermediate disk 22 can also be inserted between said disks 20 and 21. On welding, the parts 20, 21, and 22 contact each other at points due to their position in the bore holes 18 and 19 and cause formation of a steel weld. During this operation the disks 20 and 21 are pressed by the electrodes 30 and 31 and caused to flow into the milled areas of the carrier plates in the shape of a flat plate and thus become welded to said plates as well as to each other.

Of course, the carrier plates 1 and 2 may consist of other metals such as aluminum instead of steel. Thus aluminum plates can be firmly joined to each other by steel-to-steel welding which also effects an annular steel-to-aluminum welding with each respective plate.

Insert parts 20, 21, and 22 may also consist of alloys or of other metals provided they are capable of becoming alloyed with the metal composing the carrier plates 1 and 2. Said carrier plates 1 and 2 may also be alloys. If the plates 1 and 2 are made of aluminum, the through holes 18 and 19 can be omitted (although the disks receiving recesses are retained) provided a shunt circuit is effected, for instance, by means of pincers or forceps as shown in FIG. 3. As a result thereof the aluminum melts between the disk inserts 20 and 22 or, respectively, 21 and 22 so that said inserts contact each other and are welded together.

FIG. 8 shows the same plates and milled portions as illustrated in FIG. 7 and also corresponding bore holes. Two halves of T-inserts with circular hollow milled ends are inserted into said holes from both sides. They are then welded to each other. The circular milled recesses 23 and 24 serve to decrease the contact area and thus increase the electric resistance to an optimum value. Said recesses 23 and 24, therefore, are thin walled and of annular shape. Welding is effected at the entire surface after the thin-walled rings are molten at their end parts. The height of the milled rings 23 and 24 is dependent on the melting time which is equal to the welding time. The electrodes exert a continuous pressure during the entire welding procedure. The pressure of both electrodes 25 and 26 forces the heads of the two parts 27 and 28 into the plane of the surface coating or into the plane of the carrier plates, as predetermined. Such a welding procedure is also suitable for connecting carrier plates of a high electric conductivity, for instance, of aluminum with each other, for instance, by means of welding insert pieces 27 and 28 of steel or of suitable alloys.

The embodiment illustrated in FIG. 9 is quite similar to that illustrated in FIG. 1 but differs therefrom by the feature that the milling cutters 4 and 5 have a smaller width than the electrodes 6 and 7. If the milled area is kept as small as possible, automatic transfer of zinc particles from the lateral zinc coating 1a and 2b to the stripped area is made possible due to the admission of atmospheric humidity after welding whereby local galvanic cells are formed. In this manner cathodic zinc protection is achieved.

Where it is desired to prevent or minimize heat damage to the lower face coatings 2b and 3c and upper face coatings 1a and 3a in welding operations of the type illustrated in FIG. 4, the circuitry is changed so that both the upper roller 6 and the idler roller 9 are without current. Here, one pole is directly connected to plate 1 in the same manner in which the counter pole is connected to plate 2 and the currentless upper roller 6 progressively forces the rib 1h into welding contact with the underlying plate 2 as the work pieces are linearly advanced.

Even if neither plastic layer 3a, nor plastic layer 3c are present as outer protective layers at the upper and lower faces of plates 1 and 2, the outer zinc layers 1a and 2b remain intact.

FIG. 10 shows the disk milling cutter 4 and the welding electrode roller 6 whereby the milling cutter 4 rotates contrary to the direction of rotation of the welding roller 6. Immediately following the welding roller 6 there is provided a recoating device by means of which fresh zinc metal is applied to the bare strip from which the zinc coating was removed by milling. Such recoating is achieved by means of a zinc rod 41 vertically mounted in a guide 52 formed in a mounting frame 49. Said zinc rod 41 is enclosed at its upper end by a compression spring 43 which forces the zinc rod 41 by way of a pressure collar 44 downwardly upon the stripped welding seam. The lower end of the zinc rod 41 passes through an adjustable heater coil 45 so that the lower end of the zinc rod can be heated to the melting temperature of the zinc. Said zinc rod 41 can be rotatably mounted and rotated around its axis by means of pulley 46 slidably keyed thereto as at 48 and driven by belt 47.

An electric heating device 50 with resistance wires 51 is interposed between the welding roller 6 and the zinc rod 41. Said heating resistance wires 51 adjustably heat the bottom surface 50a of the heating element 50 and the plate 1 so that the lower end of the zinc rod 41 in contact with the plate 1 is caused to melt. Thereby, the temperature to which the welding seam had cooled immediately before passing through heating device 50 is raised to the melting temperature of the zinc, namely about 420°C.

The heating device 50 is supported by a ball-and-socket joint 52 so that it always rests with its entire bottom surface upon the welded seam in linear alignment therewith. In order to ensure such an alignment the device 50 is provided with a stud or pin 53 which is received into a groove or slot of the support 49. The heating element 50 is also provided with a compression spring 54 which maintains the heating element in pressure contact with the stripped welded zone in order to transmit the heat thereto as it advances from left to right as shown in FIG. 10. The reference character W in FIG. 10 indicates a thermocouple or other temperature responsive unit for controlling the temperature changes of the heating element 50.

Figure 11:
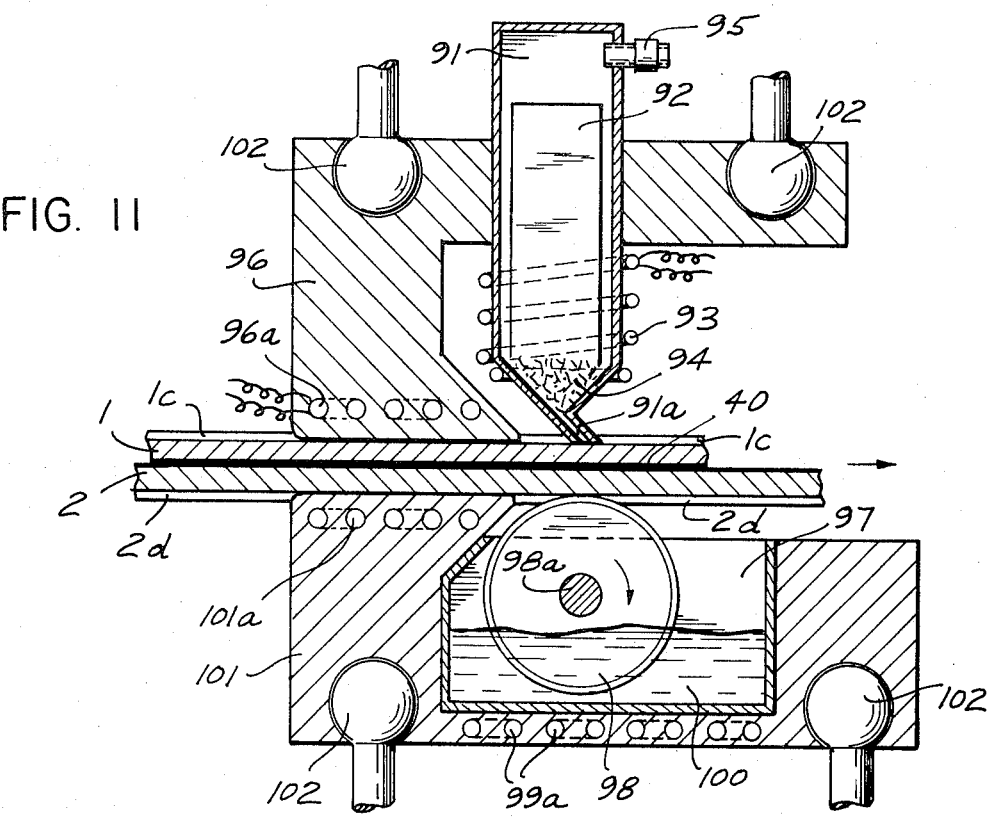
FIG. 11 is a fragmentary, longitudinal cross-sectional view of another device for recoating.

FIG. 11 shows two metal-coated plates 1 and 2 which have been welded together along seam 40. The metal coating of the upper face of plate 1 and that of the lower face of plate 2 have been stripped by milling to form decoated strips 1c and 2d, respectively. In order to replace this removed material on the respective surfaces of the welded plates, a closed container 91 with a lower slanting discharge opening or nozzle 91a is provided. A rod 92 of the same metal (zinc, for example) as the coatings 1a and 2b is placed into said container 91. Said zinc rod 92 is heated at its lower end to the melting temperature of the zinc by means of an electric coil 93 secured to the outside of the container. Glass wool 94 or the like material is placed into the lower part of the container 91 above the discharge slot 91a. Said glass wool 94 or the like material prevents the liquid zinc from flowing out of the container. At the upper part of container 91 there is provided valve 95 by means of which compressed air is introduced into the container 91 in such a controllable manner that the liquid zinc flows out of the opening 91a of the container at a rate as required, in accordance to the speed of movement of welded plates 1 and 2, in order to recoat the strip from which the coating was removed. In order to achieve satisfactory adherence of the outflowing zinc to the bare metal of the plate 1, heating element 96 is positioned ahead of the nozzle 91a. Said heating element 96 includes electric heating resistance wires 96a. The carrier metal of plate 1 is heated by means of said heating element 96 to the optimum temperature required for zinc coating.

Underneath plate 2, which is welded to plate 1, there is provided a container 97 which serves for recoating the bare metal of that plate. Said container 97 has a wheel 98 rotating about axis 98a. The face of said wheel 98 is of the width of the blank strip 2d. Below the container 97 there are provided heating wires 99a which cause melting of the zinc 100 in container 97. Just as in the case of the above described upper device, a heating element 101 with heating wires 101a for electrically heating container 97 is also arranged in advance of said container 97. Said heating element 101 increases the temperature of the blank metal zone 2d to the optimum temperature for recoating with zinc.

Wheel 98 is rotated by the movement of plates 1 and 2 and serves as a fountain roll to apply liquid zinc from container 97 to the exposed surface of the plate 2. Any excess portion of the zinc is returned by the rotating wheel 98 into the liquid zinc bath 100.

Of course, the wheel 98 can also be made from zinc in which case the axis should be resiliently adjustable vertically, as by spring loading, in order to compensate for the loss of zinc used for recoating and to maintain the wheel in coating contact with the face or stripped area of the plate. The disk or wheel 98 can also be preheated by means of a heating element (not shown) which is arranged immediately before the point of contact with the bare or stripped zone 2d. Said heating element increases the temperature of the wheel surface to approximately its melting temperature. It is also possible to preheat the stripped zone by the heating element 101 to such a degree that the zinc wheel 98 need not be preheated at all to permit sufficient zinc to be melted therefrom to recoat the stripped zone 2d with zinc.

To cause complete contact of the surface of the heating elements 96 and 101 and the discharge opening 91a and wheel 98 with the blank strips 1c and 2d, said elements and devices are mounted in spherical heads 102 so as to fit them in transverse direction to the stripped areas. The milling cutters and the welding rollers, of course, can be arranged in advance of said upper and lower recoating devices as this is shown, for instance, in FIG. 10 so that milling, welding, and recoating can be carried out in a continuous operation.

Figure 12:
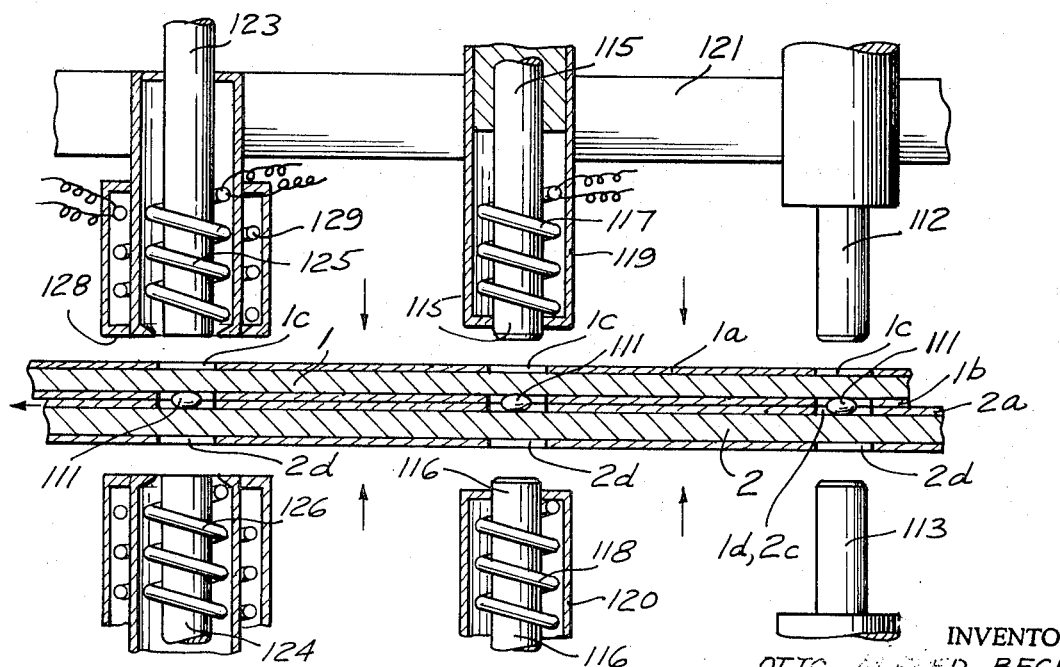
FIG. 12 is a fragmentary, longitudinal cross-sectional view of a device for spot-welding, pre-heating, and re-coating the welded spot.

FIG. 12 illustrates another embodiment of recoating zinc or other metallically coated plates by means of recoating devices which are arranged above and below the plates after they have been spot welded at the areas 111. FIG. 12 shows at the right side the electrodes 112 and 113 above and below the circular stripped outer welding areas 1c and 2d. FIG. 12 also shows the circular stripped areas 1d and 2c where the coatings between the plates have been removed. Upper heating rod 115 and lower heating rod 116 with heating resistance wires 117 and 118, respectively, in casings 119 and 120, respectively, are shown in the middle of FIG. 12. These heating rods 115 and 116 produce such a heat that molten zinc as required for recoating is applied to the stripped areas 1c and 2d by means of zinc rods 123 and 124, illustrated at the left therefrom which can also be preheated by the heating resistance wires 125 and 126. The heating resistance wires 125 and 126 can be omitted if the stripped areas 1c and 2d are sufficiently preheated. On the other hand, additional annular or ring-shaped heating around the stripped areas can be effected by means of a tubular heating element 128 containing heating resistance wires 129. Such annular heating around the areas stripped for welding prevents too rapid a decrease of the temperature after preheating by means of the heating rods 115 and 116.

Electrodes, heating rods, and zinc rods are attached to mounting plates 121. The plates 1 and 2 travel in FIG. 12 from the right toward the left. The first welding area is spot welded by the electrodes 112 and 113. The spot welded area 111 is then moved toward the left and is heated by means of the heating rods 115 and 116 to recoating temperature. Finally, on further moving the spot welded area to the left, it is recoated (zinc plated) by means of the zinc rods 123 and 124. In this manner it is possible to carry out successively a large number of spot welds with subsequent recoating of the same. Suitable stops may be provided to effect precise conformity between the described devices and the stripped welded areas.

FIG. 13 shows a galvanizing device arranged above and below the welded plates 1 and 2. The welding seam from which the coating has been removed in the form of a strip prior to welding is recoated by galvanizing with zinc, for instance, after welding. For this purpose an electrolyte container 62 has at its lower end a stopper or plug 63 through which an absorbent fabric 64, for instance, of textile material, extends from the inside 65 of the container 62 down into contact with the stripped zone and is retained within a rectangular sheet iron hollow casing 66 which is perforated as at 67 so that the electrolyte from the chamber 65 can enter thereinto. A contact pin or point 68 is provided at the upper end of said hollow body and engages a contact member 69 that is secured to the top of the container 62 and connected to the positive pole of a galvanic cell or battery 70. The upper part of the sheet iron casing 66 serves as support for anode plates 67a made of zinc or tin. The electrolyte inside the chamber 65 is in contact with said anode plates. The other pole of the galvanic cell or battery 70 is connected to the plates to be recoated. Means (not shown) may be provided to replenish the electrolyte in the chamber 65 as required.

The left half of the lower part of FIG. 13 is identical with the upper part thereof. However, as the electrolyte liquid becomes used, an air space would be formed at the upper end of the chamber 65. Said air space would endanger the impregnation of the fabric 64 of the lower device. To prevent this, there is provided a communicating liquid and air space 71 adjacent the electrolyte chamber 65 which communicates with the chamber 65 only at its lower end. One wall of the space 71 carries an inlet valve 72 through which compressed air can be forced into space 71. As a result thereof the liquid level in the electrolyte chamber 65 is kept at any time at the desired height. Furthermore, there is provided in space 71 a normally closed opening 73 for replenishing the electrolyte.

The lower and upper galvanizing devices which are preferably designed as shown in FIG. 13 can be arranged so as to be vertically adjustable and fastenable in longitudinal slots 75 and set screws 76. It is also possible to provide power or lever means for more quickly adjusting the vertical positions of the galvanizing devices.

FIG. 14 schematically illustrates the embodiment of the present invention whereby the galvanizing device of FIG. 13 and especially the orifice of the casing for the fabric can be arranged along the entire longitudinal welding seam. Thereby, relative movement between the recoating device and the plates to be welded need not take place. As a result thereof the substantial advantage is achieved that, in contrast to the embodiment of FIG. 11, galvanizing takes place simultaneously at all points of the stripped area and, therefore, proceeds within a many times shorter period of time. This is of decisive importance especially in view of the costs and expenditures to be incurred on mass production. The direction in which this FIG. 14 is viewed, is vertical to the direction of the strip-like zone 1c from which the coating has been removed, of the welding seam 40 indicated by a black line.

Of course, when welding aluminum plates, all the devices illustrated in these Figs. can be applied accordingly whereby, in place of the iron plates, aluminum plates are used and the aluminum oxide skin of the aluminum plate takes the place of the zinc or tin coating.

I claim:

1. In a method of welding two superimposed pieces of metal together in which at least one outer surface of one of said pieces is provided with a continuous layer of a metal differing from the metal piece to be welded, comprising the steps of cleanly removing by milling out by means of a milling cutter the layer from said piece in a predetermined geometrically defined area encompassing the zone of welding to expose the underlying metal in such area without affecting parts of the layer adjacent the welding zone, and welding said superimposed metal pieces together in the zone underlying the area from which said layer had been removed by passing a welding current through said metal pieces.

2. The method of claim 1 in which said metal pieces are iron or steel and in which said metal layer is zinc or tin.

3. The method of claim 1 in which said metal pieces are plates, and further including the steps of continuously advancing said plates first past a continuously operating milling cutter to remove said metal layer, then past a continuously operating welding unit, and then past a metal coating unit.

4. The method of claim 1 in which at least a portion of the metal plate underlying the area from which said layer is removed is also removed thereby to define a connecting web in said plate having a thickness less than that of said plate, said web being deformable into contact with the adjacent face of the other of said plates as an incident to welding.

5. The method of claim 3 in which both outer surfaces of both metal plates are provided with continuous layers of metal.

6. The method of claim 1 further including the step of interposing a sheet of non-conductive thermoplastic material between said plates prior to said welding step, said welding being resistance welding and being effected by electrically connecting said plates and interposing same between a pair of energized electrodes capable of applying sufficient mechanical pressure to said connecting web to cause same to be forced through and displace said sheet of thermoplastic material as it melts whereby to establish welding contact between said web and the adjacent portion of said other plate.

7. The method of claim 1 further including the step of interposing a sheet of non-conductive thermoplastic material between said plates prior to said welding step, said sheet of thermoplastic material being relieved in the area underlying said connecting web, said welding being resistance welding and being effected by interposing said plates between a non-energized support and an energized electrode, said energized electrode being electrically connected to the further of said plates, said electrode and said support together being capable of applying sufficient mechanical pressure to said connecting web to cause same to establish welding contact with the adjacent portion of said other plate.

8. The method of claim 7 in which the removed portions of said coating and said metal plate are circular to define a cylindrical recess above said connecting web and in which the opposite face of said connecting web is profiled to define a sharp-edged annulus in axial alignment with said cylindrical recess whereby to effect an annular weld between said plates.

9. In a method of welding together two superimposed pieces of aluminum having aluminum oxide layers thereon, comprising the steps of cleanly removing by milling out by means of a milling cutter at least one aluminum oxide layer from at least one of said pieces in a predetermined geometrically defined area encompassing the zone of welding to expose the underlying metal in such area without affecting parts of the layer adjacent the welding zone, and welding said superimposed aluminum pieces together in the zone underlying the area from which said layer had been removed by passing a welding current through said aluminum pieces.

10. The method of claim 9 further including the step of removing all of the aluminum oxide layers before welding.

11. The method of claim 9 in which, after removal of the aluminum oxide layer, the blank aluminum piece to be welded is reoxidized to form an aluminum oxide layer of sufficient thickness to effect optimum welding resistance.

* * * * *